(12) United States Patent
Yan et al.

(10) Patent No.: US 11,217,011 B2
(45) Date of Patent: Jan. 4, 2022

(54) PROVIDING SEMANTIC-AUGMENTED ARTIFICIAL-REALITY EXPERIENCE

(71) Applicant: Facebook Technologies, LLC, Menlo Park, CA (US)

(72) Inventors: Mingfei Yan, Seattle, WA (US); Yajie Yan, Redmond, WA (US); Richard Andrew Newcombe, Seattle, WA (US); Yuheng Ren, Bothell, WA (US)

(73) Assignee: Facebook Technologies, LLC., Menlo Park, CA (US)

( * ) Notice: Subject to any disclaimer, the term of this patent is extended or adjusted under 35 U.S.C. 154(b) by 5 days.

(21) Appl. No.: 16/389,882

(22) Filed: Apr. 19, 2019

(65) Prior Publication Data

US 2020/0334902 A1    Oct. 22, 2020

(51) Int. Cl.
| | | |
|---|---|---|
| *G06T 17/05* | (2011.01) | |
| *G06F 16/245* | (2019.01) | |
| *G06F 16/29* | (2019.01) | |
| *G06T 15/00* | (2011.01) | |
| *G06T 17/20* | (2006.01) | |
| *G06T 19/00* | (2011.01) | |
| *G06T 19/20* | (2011.01) | |

(52) U.S. Cl.
CPC ............ *G06T 17/05* (2013.01); *G06F 16/245* (2019.01); *G06F 16/29* (2019.01); *G06T 15/005* (2013.01); *G06T 17/20* (2013.01); *G06T 19/006* (2013.01); *G06T 19/20* (2013.01); *G06T 2200/04* (2013.01)

(58) Field of Classification Search
None
See application file for complete search history.

(56) References Cited

U.S. PATENT DOCUMENTS

| | | | | |
|---|---|---|---|---|
| 10,338,392 B2 * | 7/2019 | Kohler | .................... | G06F 1/163 |
| 10,657,701 B2 * | 5/2020 | Osman | .................... | G06T 13/40 |
| | (Continued) | | | |

FOREIGN PATENT DOCUMENTS

| | | |
|---|---|---|
| WO | WO 2013155217 A1 | 10/2013 |
| WO | 3419286 A1 | 12/2018 |

OTHER PUBLICATIONS

International Search Report and Written Opinion for International Application No. PCT/US2020/027763, dated Jul. 23, 2020.

*Primary Examiner* — Hilina K Demeter
(74) *Attorney, Agent, or Firm* — Baker Botts L.L.P.

(57) ABSTRACT

In one embodiment, a method includes accessing a digital map of a real-world region, where the digital map includes one or more three-dimensional meshes corresponding to one or more three-dimensional objects within the real-world region, receiving an object query including an identifier for an anchor in the digital map, positional information relative to the anchor, and information associated with a directional vector, determining a position within the digital map based on the identifier for the anchor and the positional information relative to the anchor, determining a three-dimensional mesh in the digital map that intersects with a projection of the directional vector from the determined position within the digital map, identifying metadata associated with the three-dimensional mesh, and sending the metadata to the second computing device.

20 Claims, 8 Drawing Sheets

(56) References Cited

U.S. PATENT DOCUMENTS

| | | | |
|---|---|---|---|
| 2005/0249426 A1* | 11/2005 | Badawy | H04N 19/527 |
| | | | 382/241 |
| 2016/0364912 A1 | 12/2016 | Cho | |
| 2017/0243403 A1* | 8/2017 | Daniels | G06F 3/147 |
| 2017/0345167 A1 | 11/2017 | Ard | |
| 2018/0053329 A1* | 2/2018 | Roberts | G06T 19/00 |
| 2018/0122139 A1 | 5/2018 | Janzer | |
| 2018/0144547 A1* | 5/2018 | Shakib | G06T 15/60 |
| 2019/0236842 A1* | 8/2019 | Bennett | G06F 3/04815 |
| 2020/0099954 A1* | 3/2020 | Hemmer | H04N 19/597 |
| 2020/0175764 A1* | 6/2020 | Romea | G06T 19/006 |
| 2020/0250879 A1* | 8/2020 | Foster | G05D 1/0276 |

* cited by examiner

PROVIDING SEMANTIC-AUGMENTED ARTIFICIAL-REALITY EXPERIENCE

TECHNICAL FIELD

This disclosure generally relates to artificial-reality system, and in particular, related to providing semantic-augmented artificial-reality experience.

BACKGROUND

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

SUMMARY OF PARTICULAR EMBODIMENTS

In particular embodiments, an artificial-reality system may provide persistent semantic augmented reality experience to users through light-weight client devices. The artificial-reality system may not require a client device to store a digital map of the current environment. Instead, a server may maintain three-dimensional (3D) representations of the real-world environment comprising sparse 3D point features layer, dense triangular mesh layer, and semantic layer. A client device may obtain re-localization and semantic information of its surrounding by exchanging messages with the server.

The server may generate a digital map of a real-world region based on collected video sequences and using any suitable 3D reconstruction techniques. The digital map may comprise 3D mesh, texture information, and semantic information for 3D objects within the region. The server may also add artificial-reality objects created by users to the digital map. The artificial-reality objects may be associated with their respective locations. The server may provide the stored information in response to queries from the client devices. The queries may comprise semantic queries and artificial-reality queries.

When an artificial-reality service is initiated on a client device, the client device may send the server an image captured from the current location. The server may determine the current location of the client device based on the received image from the client device. The server may send back a location information of the client device to the client device. The location information may comprise a relative location information in terms of 3D coordinates from one of one or more available anchors. The one of the one or more available anchors may be the anchor closest to a current location of the client device. The client device may be able to track its own location with respect to the anchor by calculating the movements of the client device based on its own sensors. The sensors may comprise a gyroscope or an accelerometer. The client device may report its current location information to the server at a regular interval.

The client device may send the server a semantic query by means of a 3D ray. The 3D ray may be represented by an identifier for the anchor, 3 numbers representing coordinates of the client device with respect to the anchor, and 3 numbers representing a vector originated from the current location of the client device. On receiving the semantic query, the server may determine a 3D mesh in the digital map that intersects with the ray and identify an object the mesh belongs to. The server may respond with information regarding the identified object including the intersection point and metadata associated with the identified object. The metadata may comprise semantic information associated with the identified object.

The client device may attach an artificial-reality object to the real object and report the event to the server. The server may record the created artificial-reality object to the digital map. When a client device sends a query with a 3D ray, the server may respond based on the stored information regarding the artificial-reality objects. Thus, any client device may be able to render the artificial-reality object at the location the creator placed. When an artificial-reality object is placed behind a physical object, the client device needs to occlude the artificial-reality object fully or partially depending on the portion of the artificial-reality object blocked by the physical object. The client device may determine which portion of the artificial-reality object is behind the physical object by sending rays to a number of grids in a scene. In order to improve the precision, the client device may send rays to sub-grids within a grid where a physical object blocks an artificial-reality object.

In particular embodiments, a server may access a digital map of a real-world region. The digital map may comprise one or more three-dimensional meshes corresponding to one or more three-dimensional objects within the real-world region. The server may receive an object query comprising an identifier for an anchor in the digital map, positional information relative to the anchor, and information associated with a directional vector from a client device. The server may determine a position within the digital map based on the identifier for the anchor and the positional information relative to the anchor. The server may determine a three-dimensional mesh in the digital map that intersects with a projection of the directional vector from the determined position within the digital map. The server may identify metadata associated with the three-dimensional mesh. The server may send the metadata to the client device.

In particular embodiments, a client device may determine a current position of the second computing device relative to an anchor in a digital map of a real-world region. The client device may send an object query comprising an identifier for the anchor, positional information relative to the anchor, and information associated with a directional vector to the server. A direction of the directional vector may be determined by a point in an image currently captured by a camera associated with the second computing device. The image may be displayed on a display associated with the second computing device. The client device may receive a response comprising metadata associated with a three-dimensional mesh in the digital map that intersects with a projection of the directional vector from the current position of the client device from the server. The client device may render an artificial-reality object based on the received metadata associated with the three-dimensional mesh within a pre-determined distance from an intersection point in the image. The directional vector may intersect with the three-dimensional mesh at the intersection point.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
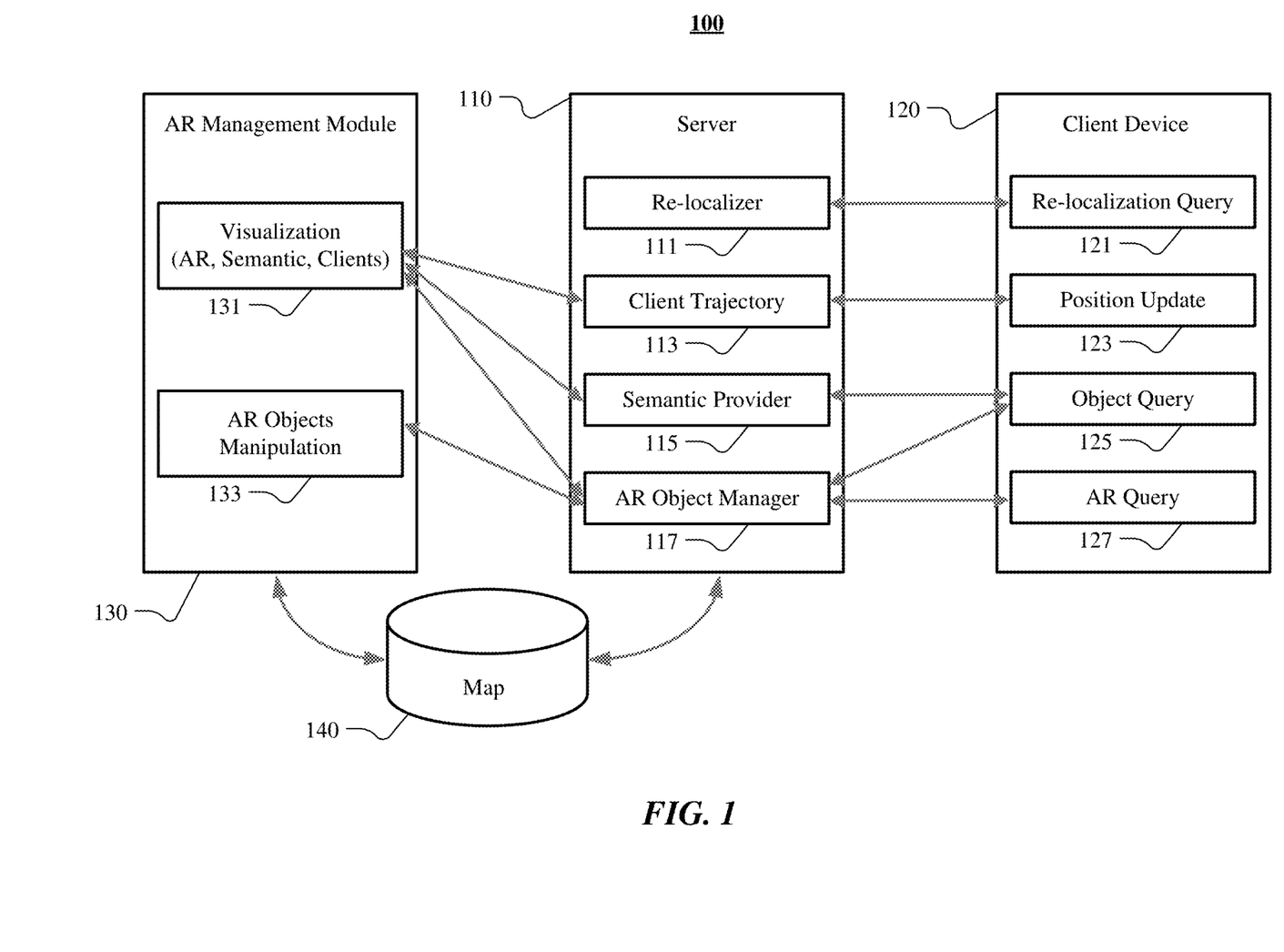
FIG. 1 illustrates an example architecture of an artificial-reality system providing semantic augmented artificial-reality experience.

FIG. 1 illustrates an example architecture of an artificial-reality system 100 providing semantic augmented artificial-reality experience. A server 110 may comprise a plurality of functional entities including a re-localizer 111, a client trajectory 113, a semantic provider 115, and an artificial-reality object manager 117. A client device 120 may comprise a plurality of functional entities including a re-localization query 121, a position update 123, an object query 125, and an artificial-reality query 127. The re-localization query 121 of the client device 120 may interact with the re-localizer 111 of the server 110. The position update 123 of the client device 120 may interact with the client trajectory 113 of the server 110. The object query 125 of the client device 120 may interact with the semantic provider 115 and the artificial-reality object manager 117 of the server 110. The artificial-reality query 127 of the client device 120 may interact with the artificial-reality object manager 117 of the server. The server 111 may access a digital map 140 of a real-world region. The digital map 140 may be generated based on a collection of images using one or more three-dimensional reconstruction techniques. The artificial-reality system 100 may comprise an artificial-reality management module 130. The artificial-reality management module 130 may comprise a plurality of functional entities including a visualization 131 and an artificial-reality objects manipulation 133. The visualization 131 may visually present artificial-reality objects, semantic information of the objects, and client devices in the digital map 140. The visualization 131 may interact with the client trajectory 113, the semantic provider 115, and the artificial-reality object manager 117 of the server 110. The artificial-reality objects manipulation 133 of the artificial-reality management module 130 may allow a user to add, modify, or delete artificial-reality objects in the digital map 140. The artificial-reality objects manipulation 133 of the artificial-reality management module 130 may interact with the artificial-reality object manager 117 of the server 110. Although this disclosure describes a particular architecture of the artificial-reality system 100, this disclosure contemplates any suitable architecture of the artificial-reality system 100.

In particular embodiments, a server 110 may access a digital map 140 of a real-world region. The digital map 140 may comprise one or more three-dimensional meshes corresponding to one or more three-dimensional objects within the real-world region. The digital map 140 may further comprise 3D point features layer, or semantic layer. In particular embodiments, the digital map 140 may be generated based on a collection of images using one or more of three-dimensional reconstruction techniques. Each image in the collection may capture a portion of the real-world region. In particular embodiments, the server 110 may generate the digital map 140. In particular embodiments, the digital map 140 may be generated by one or more other computing devices. As an example and not by way of limitation, a digital map 140 for an indoor area may be generated based on a plurality of video sequences. The video sequences may comprise a series of images capturing a portion of the indoor area. One or more computing devices may generate the digital map 140 using one or more of three-dimensional reconstruction techniques. Although this disclosure describes generating a digital map in a particular manner, this disclosure contemplates generating a digital map in any suitable manner.

Figure 2:
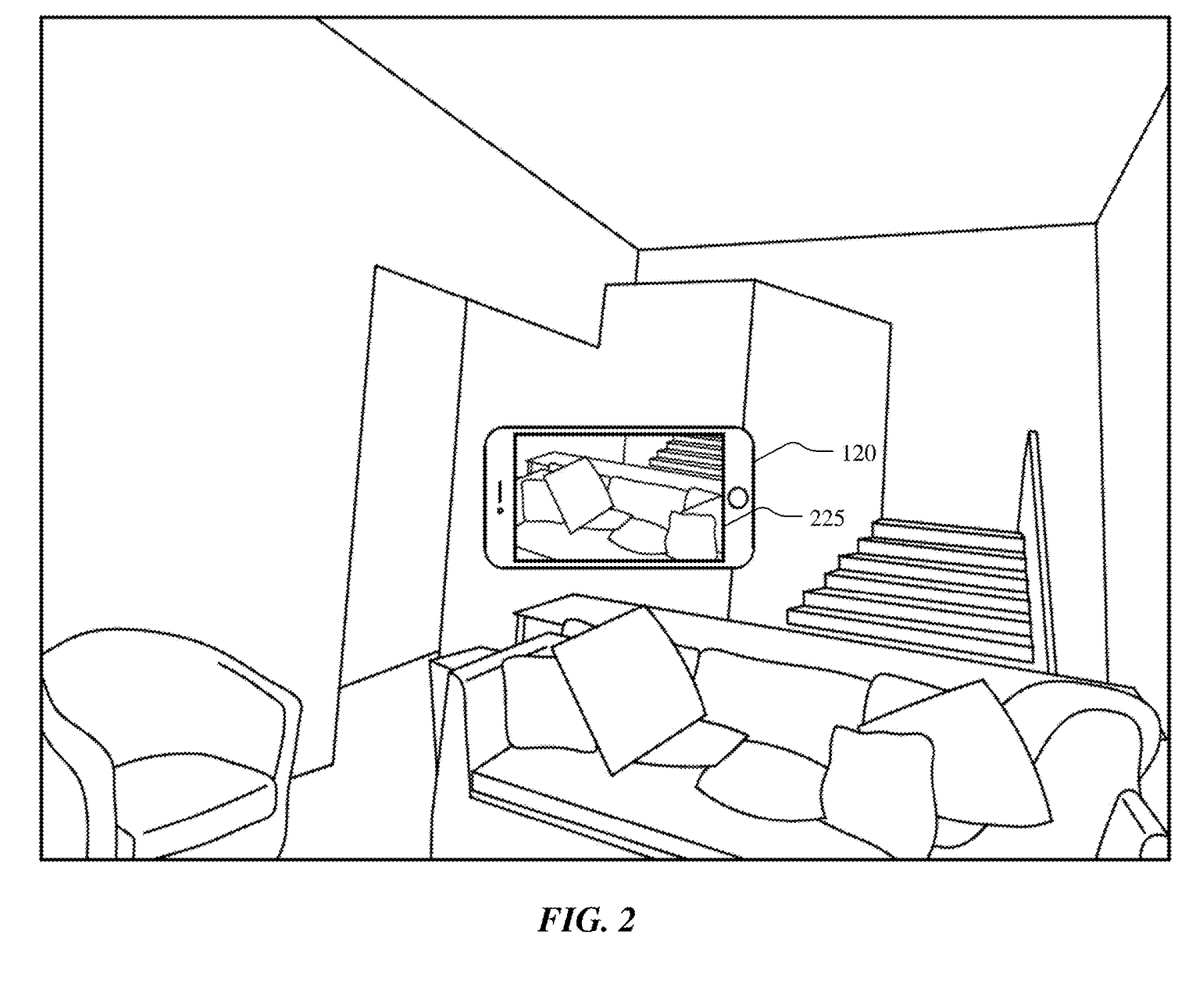
FIG. 2 illustrates an example scenario for re-localization.

In particular embodiments, a client device 120 may determine a re-localized position of the client device 120 in the real-world region by exchanging messages with the server 110. The client device 120 may send a re-localization request to the server 110. The re-localization request may comprise an image from a current position of the client device 120. FIG. 2 illustrates an example scenario for re-localization. As an example and not by way of limitation, illustrated in FIG. 2, a user associated with a client device 120 may enter an indoor area, where a digital map 140 of the indoor area has been generated. The client device 120 may be a mobile phone, a laptop computer, a tablet pc, a computing device connected to a head-mounted display, or any suitable computing device. The client device 120 may comprise a camera, a display, and one or more sensors. An application for the artificial-reality system may be installed on the client device 120. The client device 120 may capture an image 225 using the camera from the current position and send a re-localization request to the server 110, wherein the re-localization request comprises the captured image 225. Although this disclosure describes initiating a re-localization process in a particular manner, this disclosure contemplates initiating a re-localization process in any suitable manner.

Figure 3:
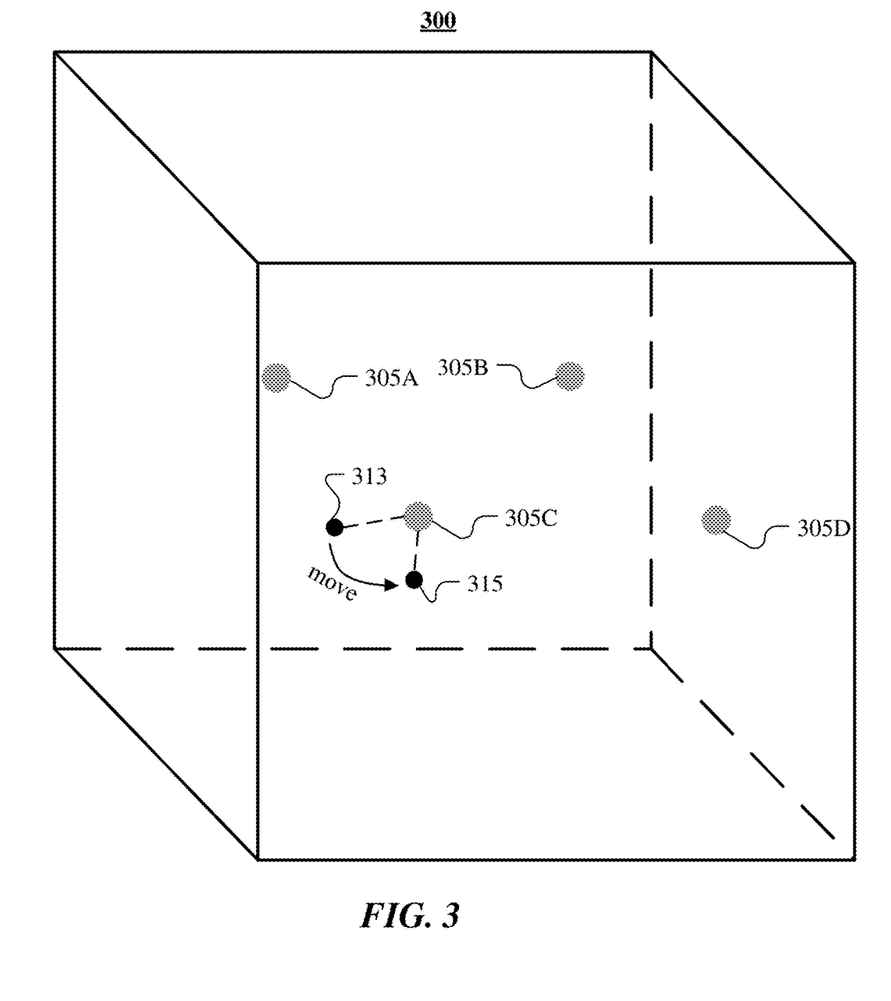
FIG. 3 illustrates an example three-dimensional space with a plurality of anchors.

In particular embodiments, the server 110 may receive the re-localization request from a client device 120. The re-localization request may comprise an image 225 taken from a current position of the client device 120 within the region. The server 110 may calculate the current position of the client device 120 based on the received image. The server 110 may identify objects in the received image 225 and determine positions of the identified objects in the digital map 140. Based on the determined positions of the identified objects in the digital map 140, the server 110 may determine the current position of the client device 120 in the digital map 140. More specifically, the server 110 may determine a current position of a camera that captured the image 225. The server 110 may send a response comprising the calculated current position of the client device 120 to the client device 120. The current position of the client device 120 may be represented by a first anchor among one or more anchors in the digital map 140 and relative coordinates of the client device 120 with respect to the first anchor. The response may comprise an identifier for the first anchor and coordinates associated with the first anchor. The first anchor may be a closest anchor to the client device 120 among the one or more anchors in the region. FIG. 3 illustrates an example three-dimensional space 300 with a plurality of anchors. As an example and not by way of limitation, illustrated in FIG. 3, four anchors 305A, 305B, 305C, and 305D may exist in a three-dimensional area. The server 110 may determine that a current position of a client device 120 is at a position 313 based on re-localization procedure. Because an anchor 305C is the closest anchor to the position 313 among the existing anchors 305A-305D in the area, the server 120 may prepare a response comprising an identifier of the anchor 305C and relative coordinates of the point 313 with respect to the anchor 305C. The server 120 may send the prepared response to the client device 120. Although this disclosure describes determining a current position of a client device with respect to an anchor in a particular manner, this disclosure contemplates determining a current position of a client device with respect to an anchor in any suitable manner.

In particular embodiments, the client device 120 may receive the response comprising a re-localized position of the client device 120 from the server 110. The re-localized position may be represented by the anchor in the digital map 140 and relative coordinates of the client device 120 with respect to the anchor. The client device 120 may compute the current position of the client device 120 by calculating movements of the client device 120 based on data from one or more sensors associated with the client device 120. The one or more sensors may comprise a gyroscope or an accelerometer. As an example and not by way of limitation, continuing with a prior example, the client device 120 determines that a position 313 is the current position of the client device 120 based on re-localization process. The client device 120 may detect that the client device 120 has moved based on data from a gyroscope or an accelerometer associated with the client device 120. The client device may compute a new position 315 by processing the data received from the gyroscope or the accelerometer associated with the client device 120. The new position 315 may be represented by the anchor 305C and relative coordinates of the position 315 with respect to the anchor 305C. The client device 120 may send position updates 123 to the server 110 to report the current position of the client device 120. Although this disclosure describes computing a current location of a client device based on a re-localized position and data from one or more sensors associated with the client device in a particular manner, this disclosure contemplates computing a current location of a client device based on a re-localized position and data from one or more sensors associated with the client device in any suitable manner.

In particular embodiments, the client device 120 may send an object query comprising an identifier for the anchor, positional information relative to the anchor, and information associated with a directional vector to the server 110. The positional information relative to the anchor may comprise relative coordinates of the current position of the client device 120. A direction of the directional vector may be determined by a point in an image currently captured by a camera associated with the client device 120. In particular embodiments, the point may be a center point of the image. In particular embodiments, the point may be a point selected by the user associated with the client device 120. In particular embodiments, the point may be a point selected by the client device 120 for a particular purpose. The image may be displayed on a display associated with the client device 120. Although this disclosure describes sending an object query to the server in a particular manner, this disclosure contemplates sending an object query to the server in any suitable manner.

In particular embodiments, the server 110 may receive an object query comprising an identifier for an anchor in the digital map 140, positional information relative to the anchor, and information associated with a directional vector from a client device 120. The position information relative to the anchor may comprise relative coordinates for a current position of the client device 120 with respect to the anchor. The information associated with the directional vector may comprise coordinates representing a direction of the vector from the determined position. The server 110 may determine a position of the client device 120 within the digital map 140 based on the identifier for the anchor and the positional information relative to the anchor. The server 110 may determine a three-dimensional mesh in the digital map 140 that intersects with a projection of the directional vector from the determined position within the digital map 140. The server 110 may identify an object in the digital map 140 that the determined three-dimensional mesh belongs to. In particular embodiments, the object may be a physical object. In particular embodiments, the object may be an artificial-reality object. The server 110 may identify metadata associated with the three-dimensional mesh. The metadata may be associated with the identified object. The server 110 may send the metadata to the client device 120. Although this disclosure describes identifying metadata associated with the three-dimensional mesh on receiving an object query in a particular manner, this disclosure contemplates identifying metadata associated with the three-dimensional mesh on receiving an object query in any suitable manner.

In particular embodiments, the client device 120 may receive from the server 110 a response comprising metadata associated with a three-dimensional mesh in the digital map 140 that intersects with a projection of the directional vector from the current position of the client device 120. The client device 120 may render an artificial-reality object based on the received metadata associated with the three-dimensional mesh within a pre-determined distance from an intersection point in the image. The directional vector may intersect with the three-dimensional mesh at the intersection point. In particular embodiments, the response may comprise information associated with the intersection point. In particular embodiments, the three-dimensional mesh in the digital map 140 may not be associated with any metadata. In such cases, the response from the server 110 may not comprise metadata. The client device 120 may not render any artificial-reality object. Although this disclosure describes rendering an artificial-reality object upon receiving a response to an object query in a particular manner, this disclosure contemplates rendering an artificial-reality object upon receiving a response to an object query in any suitable manner.

Figure 4:
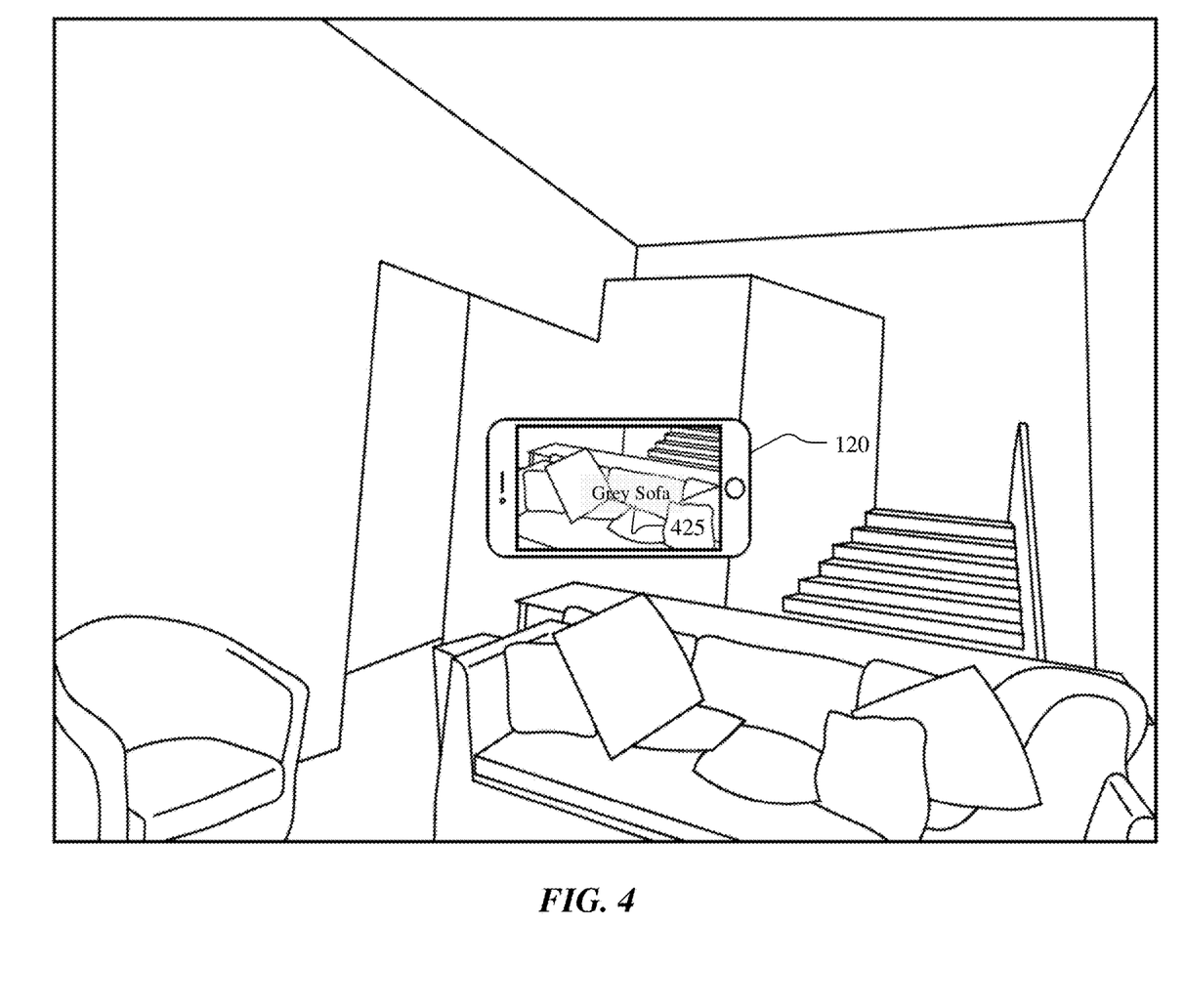
FIG. 4 illustrates an example situation where semantic information is presented to the user.

In particular embodiments, the metadata received on the response may comprise semantic information associated with the identified object. The identified object may be a physical object. In such a case, the client device 120 may render a text box comprising the semantic information. FIG. 4 illustrates an example situation where semantic information is presented to the user. As an example and not by way of limitation, illustrated in FIG. 4, the client device 120 sent an object query with a directional vector toward the sofa in the image captured by the client device 120. The client device 120 may receive a response from the server 110 comprising semantic information associated with the sofa, which is "Grey Sofa." The client device 120 may render a text box 425 in the image with text "Grey Sofa." The position of the text box 425 is within a threshold distance from the intersection point received in the response. Although this disclosure describes rendering semantic information associated with an object upon receiving the semantic information from the server in a particular manner, this disclosure contemplates rendering semantic information associated with an object upon receiving the semantic information from the server in any suitable manner.

Figure 5:
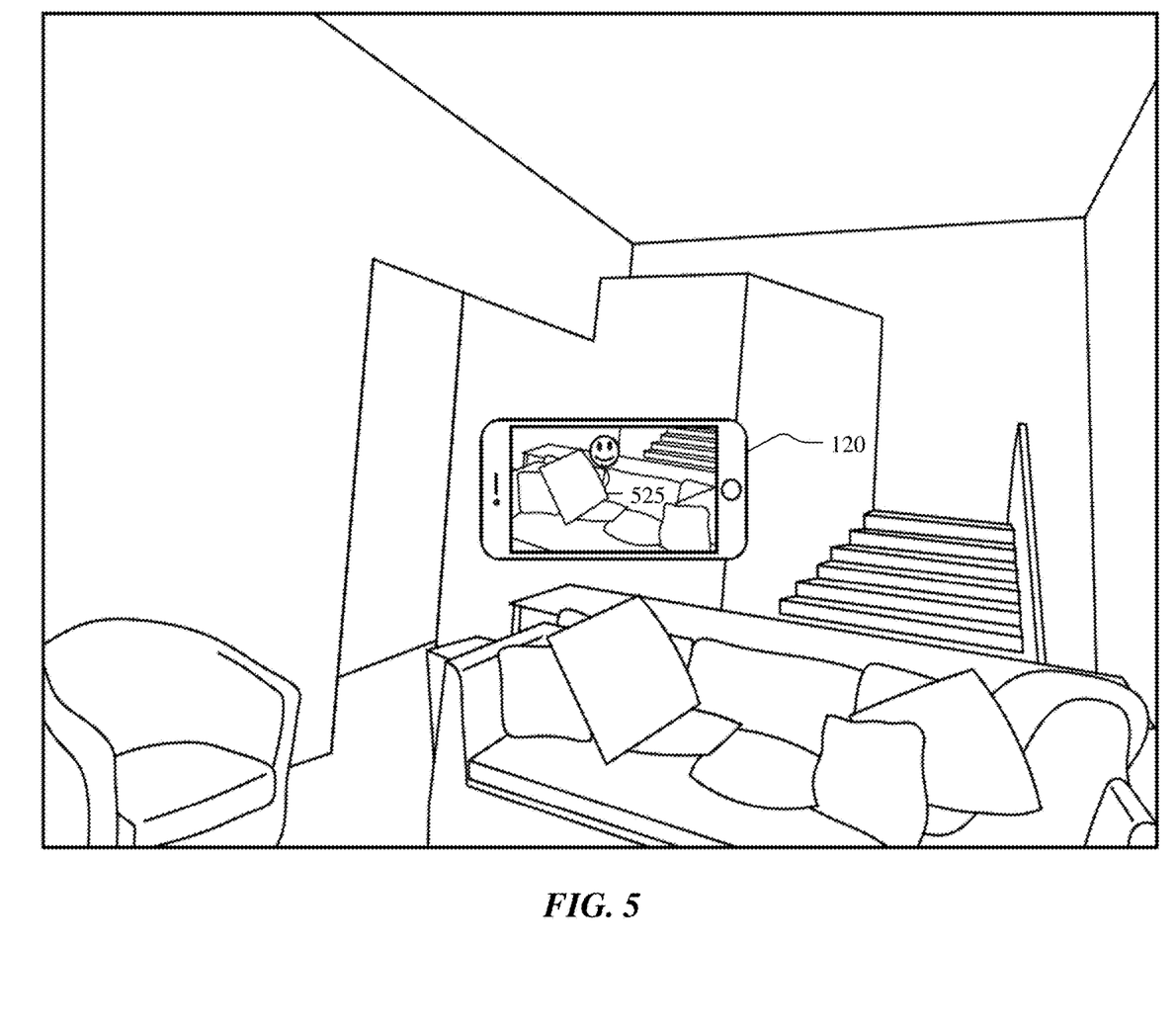
FIG. 5 illustrates an example situation where an artificial-reality object is rendered based on rendering instructions from the server.

In particular embodiments, the three-dimensional mesh may belong to an artificial-reality object. In such a case, the metadata associated with the three-dimensional mesh may comprise rendering instructions for the artificial-reality object. The client device 120 may render the artificial-reality object based on the rendering instructions for the artificial-reality object. FIG. 5 illustrates an example situation where an artificial-reality object is rendered based on rendering instructions from the server. As an example and not by way of limitation, illustrated in FIG. 5, the client device 120 sent an object query with a directional vector toward space above a table behind the sofa in the image captured by the client device 120. The client device may receive a response with rendering instructions for a smiley face icon 525. The client device may render the smiley face icon 525 based on the rendering instructions received in the response. Although this disclosure describes rendering artificial-reality object upon receiving rendering instructions from the server in a particular manner, this disclosure contemplates rendering artificial-reality object upon receiving rendering instructions from the server in any suitable manner.

In particular embodiments, the client device 120 may send artificial-reality object query. The artificial-reality object query may comprise information associated with a current location of the client device 120. The client device 120 may receive an artificial-reality object response comprising metadata associated with available artificial-reality objects around the client device. The client device 120 may render the artificial-reality objects based on the rendering instructions in the metadata. Although this disclosure describes particular artificial-reality object query and artificial-reality object response, this disclosure contemplates any suitable artificial-reality object query and artificial-reality object response.

In particular embodiments, the client device 120 may need to determine whether the artificial-reality object is placed behind one or more physical objects. The client device 120 may send an object query with a directional vector from the current location of the client device 120 to the center of the artificial-reality object. Upon receiving an object response, the client device 120 may determine that the artificial-reality object is placed behind a physical object if the object response comprises metadata associated with the physical object. The client device 120 may occlude the artificial-reality object behind the physical object. Although this disclosure describes determining whether an artificial-reality object is placed behind a physical object in a particular manner, this disclosure contemplates determining whether an artificial-reality object is placed behind a physical object in any suitable manner.

In particular embodiments, the client device 120 may need to determine whether the artificial-reality object is placed behind one or more physical objects. The client device 120 may split an area of the image in which the artificial-reality object is rendered into a plurality of grids. The client device 120 may send an object query for each grid to the server 110. The client device 120 may receive, for each grid, a response associated with the grid from the server 110. The client device 120 may determine, for each grid, the artificial-reality object is placed behind one or more physical objects in the grid if the response associated with the grid comprises metadata associated with a physical object. The client device 120 may occlude the artificial-reality object based on portions of the artificial-reality object located behind the one or more physical objects. In order to improve the precision, the client device 120 may split a grid into a plurality of sub-grids if the artificial-reality object is determined to be placed behind one or more physical objects in the grid and send an object query for each sub-grid to the server 110. Although this disclosure describes determining whether an artificial-reality object is placed behind one or more physical objects in a particular manner, this disclosure contemplates determining whether an artificial-reality object is placed behind one or more physical objects in any suitable manner.

In particular embodiments, the server 110 may receive a request to create an artificial-reality object at a position in the region from a client device 120. The request may comprise a type of the artificial-reality object, an identifier for the artificial-reality object, rendering instructions for the artificial-reality object, semantic information associated with the artificial-reality object, or coordinates for the position. The server 110 may check whether the client device 120 has enough privilege to add the artificial-reality object to the digital map 140. The server 110 may add received information associated with the artificial-reality object to the digital map 140. As an example and not by way of limitation, the user associated with the client device 120 may want to add a smiley icon at a particular location in the area. The user may select the icon from a list of available icons in the user interface on the client device 120. The user may drag and drop the selected icon to a location in the image displayed on the display associated with the client device 120. The client device may send a request to create the selected smiley icon at the position that the user dropped the icon at to the server 120. The request may comprise information associated with the selected icon including a type, identifier, size, and rendering instructions and the position information where the icon should be rendered at. The request may further comprise semantic information associated with the smiley icon, such as a name of the icon, or text the user added to the icon. Although this disclosure describes adding an artificial-reality object to the digital map in a particular manner, this disclosure contemplates adding an artificial-reality object to the digital map in any suitable manner.

In particular embodiments, the server 110 may receive a request to modify an artificial-reality object in the digital map 140 from a client device 120. The request may comprise an identifier of the artificial-reality object in the digital map 140, and instructions to modify the artificial-reality object. The server 110 may check whether the client device 120 has enough privilege to modify the artificial-reality object in the digital map 140. The server 110 may modify information associated with the artificial-reality object in the digital map 140 based on the received instructions. Although this disclosure describes modifying an artificial-reality object in the digital map in a particular manner, this disclosure contemplates modifying an artificial-reality object in the digital map in any suitable manner.

In particular embodiments, the server 110 may receive a request to delete an artificial-reality object from the digital map 140 from a client device 120. The request may comprise an identifier of the artificial-reality object that uniquely identifies the artificial-reality object in the digital map 140. The server 110 may check whether the client device 120 has enough privilege to delete the artificial-reality object from the digital map 140. The server 110 may delete information associated with the artificial-reality object from the digital map 140. Although this disclosure describes deleting an artificial-reality object from the digital map in a particular manner, this disclosure contemplates deleting an artificial-reality object from the digital map in any suitable manner.

In particular embodiments, the server 110 may be associated with an artificial-reality management module 130. One or more artificial-reality objects in the digital map 140 may be viewed on a display of the artificial-reality management module 130. The visualization functional entity 131 of the artificial-reality management module 130 may present artificial-reality objects, semantic information for artificial-reality objects or physical objects, or active client devices to a user. The one or more artificial-reality objects may be added, modified, or deleted by the artificial-reality management module 130. The artificial-reality objects manipulation functional entity 133 of the artificial-reality management module 130 may add, modify or delete artificial-reality object in the digital maps 140 based on user inputs. Although this disclosure describes functionalities of the artificial-reality management module in a particular manner, this disclosure contemplates functionalities of the artificial-reality management module in any suitable manner.

Figure 6:
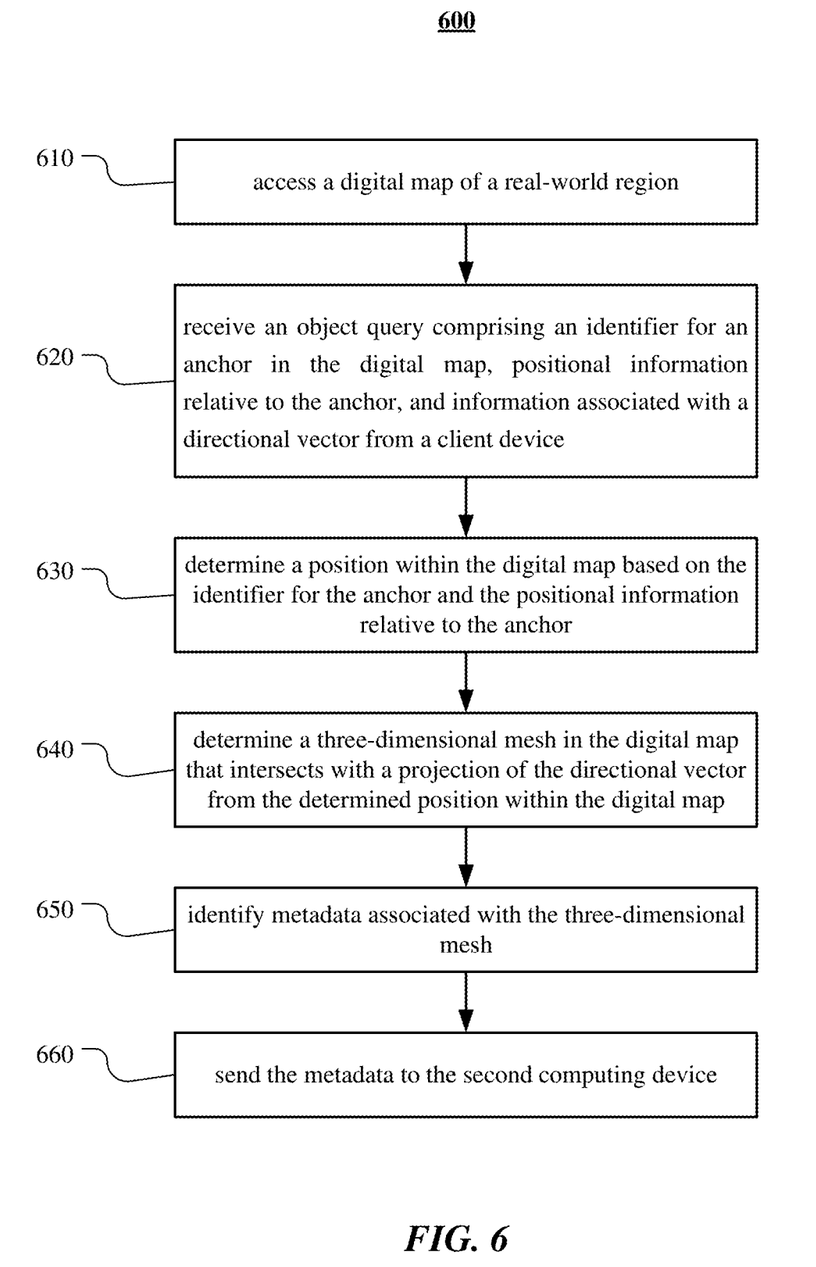
FIG. 6 illustrates an example method for identifying metadata associated with a three-dimensional mesh upon receiving an object query.

FIG. 6 illustrates an example method 600 for identifying metadata associated with a three-dimensional mesh upon receiving an object query. The method may begin at step 610, where a server may access a digital map of a real-world region. The digital map may comprise one or more three-dimensional meshes corresponding to one or more three-dimensional objects within the real-world region. At step 620, the server may receive an object query comprising an identifier for an anchor in the digital map, positional information relative to the anchor, and information associated with a directional vector from a client device. At step 630, the server may determine a position within the digital map based on the identifier for the anchor and the positional information relative to the anchor. At step 640, the server may determine a three-dimensional mesh in the digital map that intersects with a projection of the directional vector from the determined position within the digital map. At step 650, the server may identify metadata associated with the three-dimensional mesh. At step 660, the server may send the metadata to the second computing device. Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for identifying metadata associated with a three-dimensional mesh upon receiving an object query including the particular steps of the method of FIG. 6, this disclosure contemplates any suitable method for identifying metadata associated with a three-dimensional mesh upon receiving an object query including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Figure 7:
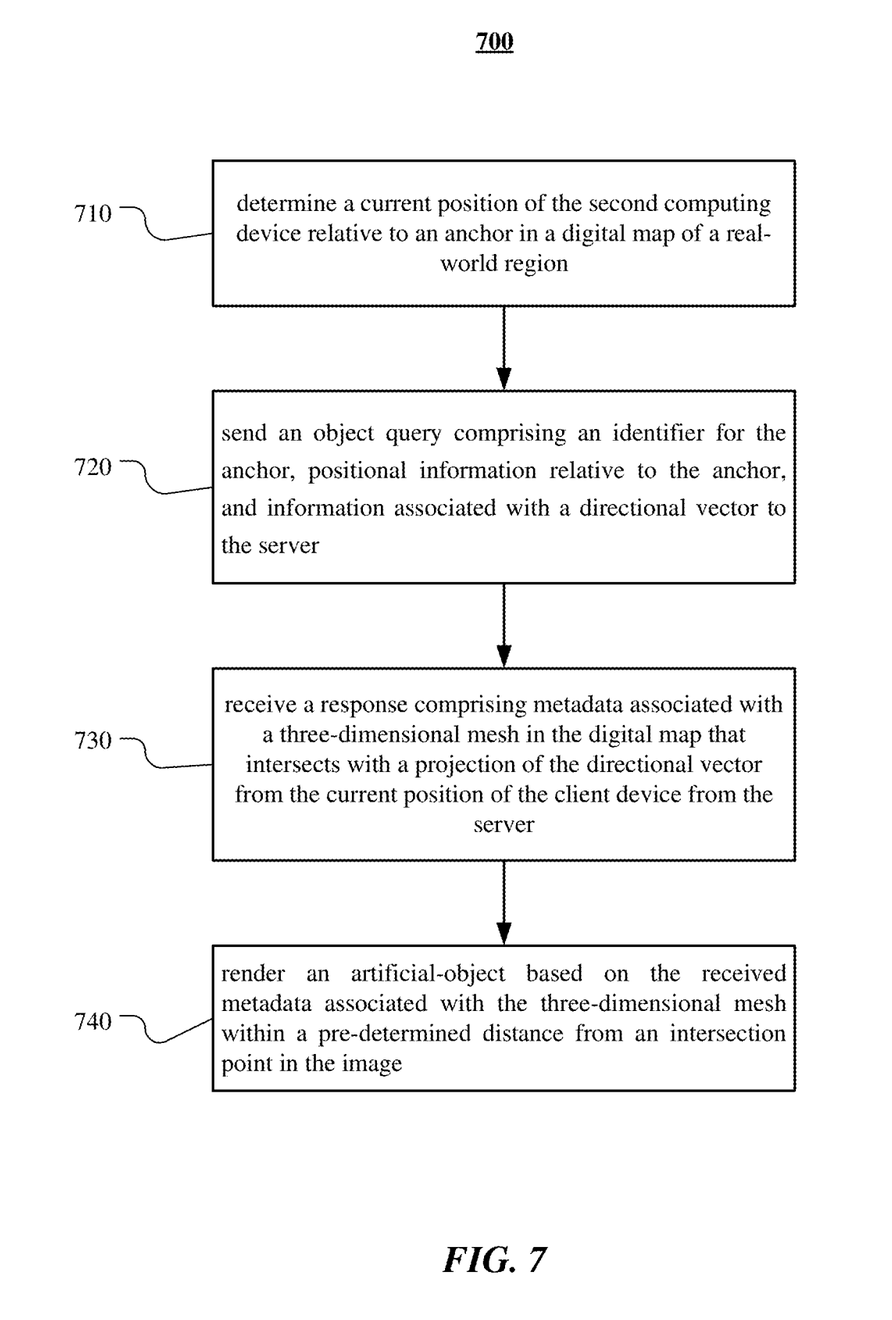
FIG. 7 illustrates an example method for rendering an artificial-reality object based on received metadata.

FIG. 7 illustrates an example method 700 for rendering an artificial-reality object based on received metadata. The method may begin at step 710, where a client device may determine a current position of the second computing device relative to an anchor in a digital map of a real-world region. At step 720, the client device may send an object query comprising an identifier for the anchor, positional information relative to the anchor, and information associated with a directional vector to the server. A direction of the directional vector may be determined by a point in an image currently captured by a camera associated with the second computing device. The image may be displayed on a display associated with the second computing device. At step 730, the client device may receive a response comprising metadata associated with a three-dimensional mesh in the digital map that intersects with a projection of the directional vector from the current position of the client device from the server. At step 740, the client device may render an artificial-reality object based on the received metadata associated with the three-dimensional mesh within a pre-determined distance from an intersection point in the image. The directional vector may intersect with the three-dimensional mesh at the intersection point. Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for rendering an artificial-reality object based on received metadata including the particular steps of the method of FIG. 7, this disclosure contemplates any suitable method for rendering an artificial-reality object based on received metadata including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Systems and Methods

Figure 8:
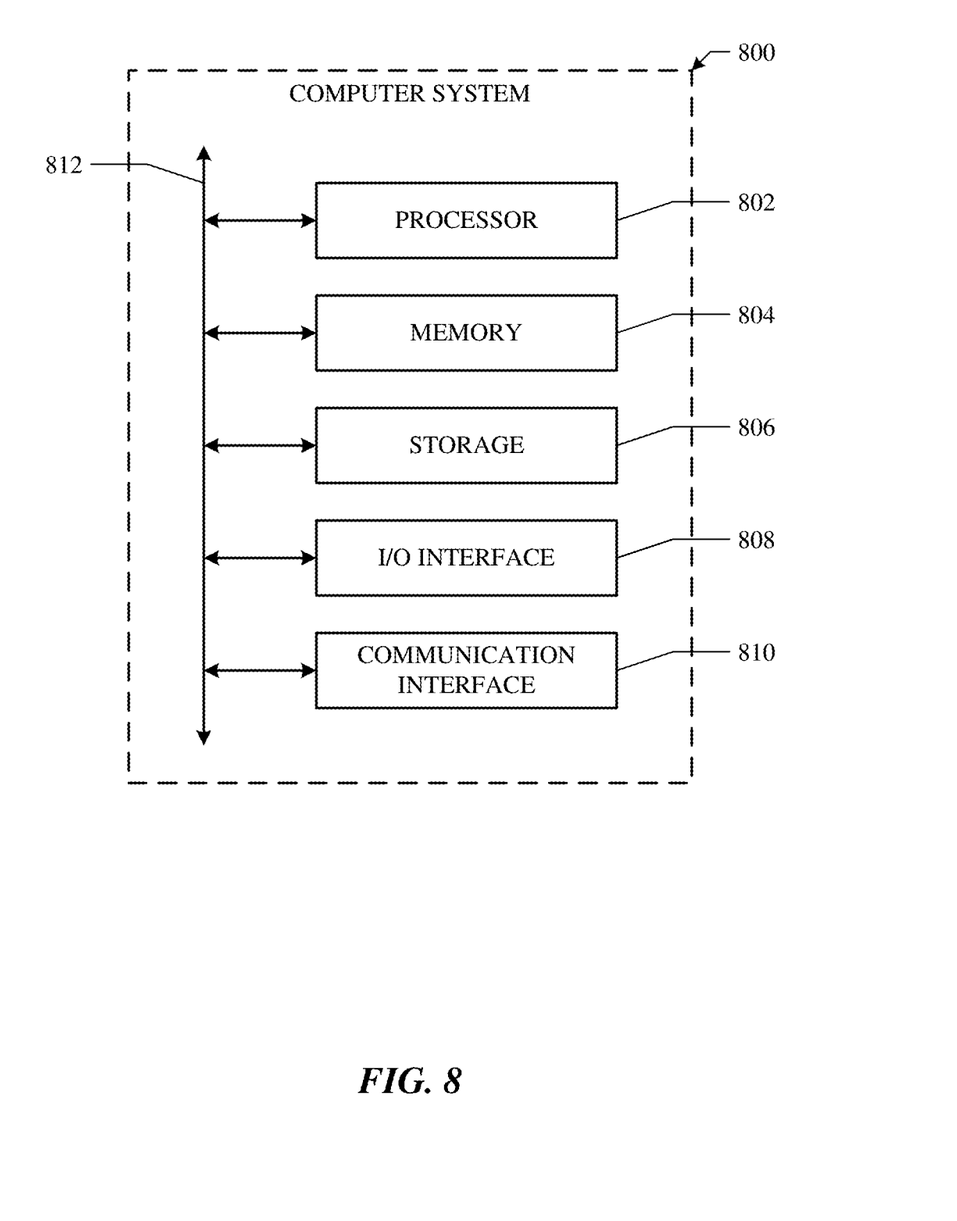
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a server:
accessing a digital map of a real-world region, wherein the digital map comprises one or more three-dimensional virtual representations corresponding to one or more three-dimensional objects within the real-world region;
receiving, from a second computing device, an object query comprising information for determining a current position of the second computing device within the digital map and information associated with a directional vector representing a direction from the current position of the second computing device, wherein the information for determining the current position of the second computing device within the digital map comprises an identifier for an anchor in the digital map and a positional information relative to the anchor, wherein the anchor is selected among a plurality of anchors based on proximity to the second computing device, and wherein the second computing device uses the selected anchor for tracking the current position in the digital map;
determining the current position of the second computing device within the digital map based on the identifier for the anchor and the positional information relative to the anchor;
identifying a three-dimensional virtual representation among the one or more three-dimensional virtual representations in the digital map located at an intersection point that intersects with the directional vector from the determined current position of the second computing device within the digital map;
identifying a three-dimensional object that corresponds to the identified three-dimensional virtual representation; and
sending metadata associated with the identified three-dimensional object and information associated with the intersection point to the second computing device, wherein the second computing device renders an artificial-reality object based on the metadata and positions the artificial-reality object within a pre-determined distance from the intersection point.

2. The method of claim 1, wherein the digital map was generated based on a collection of images using one or more of three-dimensional reconstruction techniques, wherein each image in the collection captures a portion of the real-world region.

3. The method of claim 1, wherein the information associated with the directional vector comprises coordinates representing a direction of the vector from the current position of the second computing device within the digital map.

4. The method of claim 1, wherein the metadata comprises semantic information associated with the identified object.

5. The method of claim 1, wherein the identified three-dimensional object is an artificial-reality object.

6. The method of claim 5, wherein the metadata associated with the identified three-dimensional object comprises rendering instructions for the artificial-reality object.

7. The method of claim 1, further comprising:
receiving, from a second computing device, a request to create an artificial-reality object at a position in the region, wherein the request comprises a type of the artificial-reality object, an identifier for the artificial-reality object, rendering instructions for the artificial-reality object, semantic information associated with the artificial-reality object, or coordinates for the position; and
adding received information associated with the artificial-reality object to the digital map.

8. The method of claim 1, further comprising:
receiving, from a third computing device, a re-localization request comprising an image taken from a current position of the third computing device within the region;
calculating the current position of the third computing device based on the received image; and
sending, to the third computing device, a response comprising the calculated current position of the third computing device, wherein the current position of the third computing device is represented by a first anchor among a plurality of anchors in the digital map and relative coordinates of the third computing device with respect to the first anchor.

9. The method of claim 8, wherein the response comprises an identifier for the first anchor and coordinates associated with the first anchor.

10. The method of claim 8, wherein the first anchor is a closest anchor to the third computing device among the plurality of anchors in the region.

11. The method of claim 1, wherein the sever is associated with an artificial-reality management module, wherein one or more artificial-reality objects are added, modified, or deleted by the artificial-reality management module.

12. A method comprising, by a second computing device:
determining a current position of the second computing device relative to an anchor in a digital map of a real-world region, wherein the anchor is selected among a plurality of anchors based on proximity to the second computing device, and wherein the second computing device uses the selected anchor for tracking the current position in the digital map;
sending, to a server, an object query comprising information associated with the current position of the second computing device within the digital map and information associated with a directional vector, wherein a direction of the directional vector is determined by a point in an image currently captured by a camera associated with the second computing device, wherein the image is displayed on a display associated with the second computing device, and wherein the information associated with the current position of the second computing device within the digital map comprises an identifier for the anchor and positional information relative to the anchor;
receiving, from the server, a response comprising metadata associated with a three-dimensional object in the digital map and information associated with an intersection point that intersects with a projection of the directional vector from the current position of the second computing device; and
rendering an artificial-reality object based on the received metadata associated with the three-dimensional object within a pre-determined distance from the intersection point in the image.

13. The method of claim 12, wherein determining the current position of the second computing device comprises:

determining a re-localized position of the second computing device in the region by exchanging messages with the server, wherein the re-localized position is represented by the anchor in the digital map and relative coordinates of the second computing device with respect to the anchor; and computing the current position of the second computing device by calculating movements of the second computing device from the re-localized position based on data from one or more sensors associated with the second computing device.

14. The method of claim 13, wherein the one or more sensors comprise a gyroscope or an accelerometer.

15. The method of claim 12, wherein the metadata associated with the three-dimensional object comprises semantic information associated with the three-dimensional object, and wherein the artificial-reality object is a text box comprising the semantic information.

16. The method of claim 12, wherein the three-dimensional object is the artificial-reality object, and wherein the metadata associated with the three-dimensional object comprises rendering instructions for the artificial-reality object.

17. The method of claim 16, further comprising:
determining whether the artificial-reality object is placed behind one or more physical objects; and
occluding the artificial-reality object based on portions of the artificial-reality object located behind the one or more physical objects.

18. The method of claim 17, wherein determining whether the artificial-reality object is placed behind the one or more physical objects comprises:
splitting an area of the image in which the artificial-reality object is rendered into a plurality of grids;
sending, to the server, for each grid, an object query;
receiving, from the server, for each grid, a response associated with the grid; and
determining, for each grid, the artificial-reality object is placed behind one or more physical objects in the grid if the response associated with the grid comprises metadata associated with a physical object.

19. The method of claim 18, wherein a grid is split into a plurality of sub-grids if the artificial-reality object is determined to be placed behind one or more physical objects in the grid.

20. A system comprising: one or more processors; and a non-transitory memory coupled to the processors comprising instructions executable by the processors, the processors operable when executing the instructions to:
access a digital map of a real-world region, wherein the digital map comprises one or more three-dimensional virtual representations corresponding to one or more three-dimensional objects within the real-world region;
receive, from a second computing device, an object query comprising information for determining a current position of the second computing device within the digital map and information associated with a directional vector representing a direction from the current position of the second computing device, wherein the information for determining the current position of the second computing device within the digital map comprises an identifier for an anchor in the digital map and a positional information relative to the anchor, wherein the anchor is selected among a plurality of anchors based on proximity to the second computing device, and wherein the second computing device uses the selected anchor for tracking the current position in the digital map;
determine the current position of the second computing device within the digital map based on the identifier for the anchor and the positional information relative to the anchor;
identify a three-dimensional virtual representation among the one or more three-dimensional virtual representations in the digital map located at an intersection point that intersects with the directional vector from the determined current position of the second computing device within the digital map;
identify a three-dimensional object that corresponds to the identified three-dimensional virtual representation; and
send metadata associated with the identified three-dimensional object and information associated with the intersection point to the second computing device, wherein the second computing device renders an artificial-reality object based on the metadata and positions the artificial-reality object within a pre-determined distance from the intersection point.

* * * * *